United States Patent
Kajiyama et al.

(10) Patent No.: US 10,209,496 B2
(45) Date of Patent: Feb. 19, 2019

(54) ZOOM LENS AND IMAGE PICKUP APPARATUS INCLUDING THE SAME

(71) Applicant: CANON KABUSHIKI KAISHA, Tokyo (JP)

(72) Inventors: Kazuhiko Kajiyama, Utsunomiya (JP); Takeyoshi Saiga, Tokyo (JP); Masatsugu Nakano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 14/882,504

(22) Filed: Oct. 14, 2015

(65) Prior Publication Data

US 2016/0109691 A1 Apr. 21, 2016

(30) Foreign Application Priority Data

Oct. 21, 2014 (JP) ................. 2014-214505

(51) Int. Cl.
 *G02B 15/14* (2006.01)
 *G02B 13/14* (2006.01)
 (Continued)

(52) U.S. Cl.
 CPC ......... *G02B 13/146* (2013.01); *G02B 15/173* (2013.01); *G02B 27/0025* (2013.01)

(58) Field of Classification Search
 CPC . G02B 1/00; G02B 1/04; G02B 1/041; G02B 13/00; G02B 13/14; G02B 13/146;
 (Continued)

(56) References Cited

U.S. PATENT DOCUMENTS 7,672,061 B2 * 3/2010 Tsutsumi ............. G02B 15/173
 359/676
7,679,837 B2 * 3/2010 Souma ................. G02B 15/161
 359/676
(Continued)

FOREIGN PATENT DOCUMENTS

JP 02126213 A 5/1990
JP 2009204655 A 9/2009
(Continued)

OTHER PUBLICATIONS

Notice of Allowance issued in U.S. Appl. No. 14/878,099 dated Aug. 29, 2016.
(Continued)

*Primary Examiner* — Thong Q Nguyen
(74) *Attorney, Agent, or Firm* — Rossi, Kimms & McDowell LLP

(57) ABSTRACT

Provided is a zoom lens, including, in order from an object side to an image side, first, second, and third lens units having positive, negative, and positive refractive powers, respectively. The second lens unit moves toward image side during zooming from a wide angle end to a telephoto end, and an interval between adjacent lens units is changed during zooming. The first lens unit includes a lens pair of a positive lens (LP1) and a negative lens (LN1) that are arranged adjacent to each other. A refractive index of a material at 400 nm wavelength, a refractive index of a material at 1,050 nm wavelength, a refractive index of a material at 1,700 nm wavelength, an Abbe number and a partial dispersion ratio of a material, Abbe numbers and partial dispersion ratios of materials for the positive lens (LP1) and the negative lens (LN1) are each appropriately set.

10 Claims, 9 Drawing Sheets

(51) Int. Cl.
*G02B 27/00* (2006.01)
*G02B 15/173* (2006.01)

(58) Field of Classification Search
CPC ........ G02B 15/00; G02B 15/14; G02B 15/15;
G02B 15/16; G02B 15/173; G02B 15/20;
G02B 15/24; G02B 15/28; G02B 27/0025
See application file for complete search history.

(56) References Cited

U.S. PATENT DOCUMENTS

| | | | |
|---|---|---|---|
| 8,670,187 B2 | 3/2014 | Mitsuhashi | |
| 8,797,657 B2 | 8/2014 | Mitsuhashi | |
| 9,535,237 B2* | 1/2017 | Saiga | G02B 13/146 |
| 2010/0238566 A1 | 9/2010 | Inomoto et al. | |
| 2011/0038054 A1* | 2/2011 | Maeda | G02B 13/04 359/649 |
| 2013/0070123 A1* | 3/2013 | Imaoka | G02B 27/0025 348/240.3 |
| 2015/0043078 A1* | 2/2015 | Suzuki | G02B 15/173 359/576 |
| 2016/0147048 A1* | 5/2016 | Nakano | G02B 13/146 359/687 |
| 2016/0154217 A1* | 6/2016 | Fujisaki | G02B 15/173 359/683 |
| 2016/0306147 A1* | 10/2016 | Nakano | G02B 15/177 |

FOREIGN PATENT DOCUMENTS

| | | |
|---|---|---|
| JP | 2011053526 A | 3/2011 |
| JP | 2012002902 A | 1/2012 |
| JP | 2012093548 A | 5/2012 |
| JP | 2013088782 A | 5/2013 |
| JP | 2013171207 A | 9/2013 |

OTHER PUBLICATIONS

Office Action issued in U.S. Appl. No. 14/942,003 dated Feb. 21, 2018.
Inc., Ohara. "S-LAL61." Ohara Inc. : S-LAL, 2018, www.ohara-inc.co.jp/en/product/optical/list/s-lam.html.
Inc., Ohara. "S-LAH66." Ohara Inc. : S-LAH, 2018, www.ohara-inc.co.jp/en/product/optical/list/s-lah.html.
Inc., Ohara. "S-FPL51." Ohara Inc. : S-FPL, 2018, www.ohara-inc.co.jp/en/product/optical/list/s-fpl.html.
Inc., Ohara. "S-NPH1." Ohara Inc. : S-NPH, 2018, www.ohara-inc.co.jp/en/product/optical/list/s-nph.html.
Inc., Ohara. "S-LAH65V." Ohara Inc. : S-Lah, 2018, www.ohara-inc.co.jp/en/product/optical/list/s-lah.html.

* cited by examiner

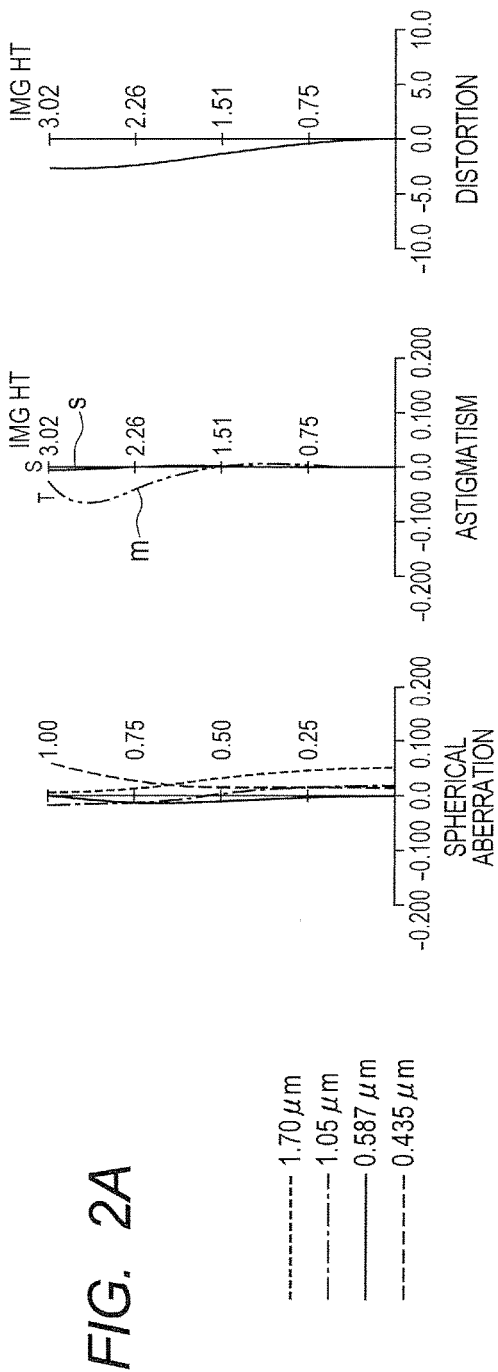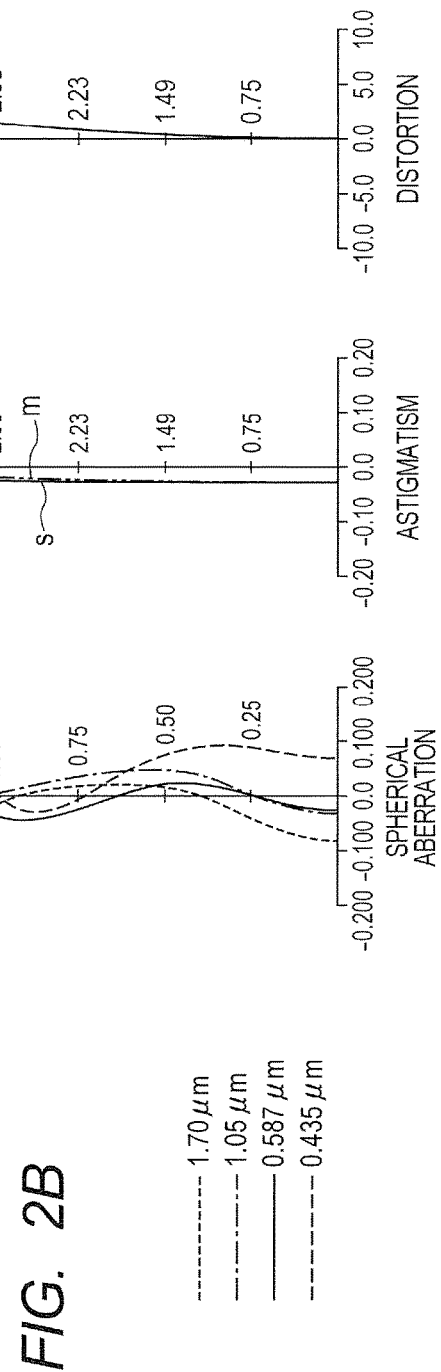

ZOOM LENS AND IMAGE PICKUP APPARATUS INCLUDING THE SAME

BACKGROUND OF THE INVENTION

Field of the Invention

The present invention relates to a zoom lens, and more particularly, to a zoom lens suitable as an image pickup optical system to be used in an image pickup apparatus, such as a monitoring camera, a digital camera, a video camera, and a broadcasting camera.

Description of the Related Art

In recent years, as an image pickup optical system to be used in an image pickup apparatus, a zoom lens is required to have a high zoom ratio and a small overall system size. For example, as an image pickup optical system for a monitoring camera, the zoom lens is required to have a small overall system size and a high zoom ratio, and is also required that favorable optical characteristics can be obtained in imaging during daytime and at night.

In general, a monitoring camera uses visible light in imaging during daytime, and uses near-infrared light in imaging at night. The use of near-infrared light provides an advantage in that imaging can be carried out with less influence of scattering than when visible light is used, for example, in a dense fog with low visibility. Thus, it is demanded that the zoom lens to be used in a monitoring camera be corrected for an aberration in a broad wavelength range from a visible range to a near-infrared range. Hitherto, there is known a zoom lens having a high zoom ratio, which is corrected for various aberrations across a visible range to a near-infrared range.

In Japanese Patent Application Laid-Open No. 2011-053526, there is disclosed a zoom lens having a zoom ratio of 18.73. This zoom lens includes, in order from an object side to an image side, first to fourth lens units having positive, negative, positive, and positive refractive powers, and an interval between adjacent less units is changed during zooming.

In Japanese Patent Application Laid-Open No. 2013-88792, there is disclosed a zoom lens having a zoom ratio of 2.44. This zoom lens includes, in order from an object side to an image side, first to third lens units having positive, negative, and positive refractive powers, and an interval between adjacent lens units is changed during zooming.

In Japanese Patent Application Laid-Open No. 2013-171207, there is disclosed a zoom lens having a zoom ratio of 5.92. This zoom lens include, in order from an object side to an image side, first to fifth lens units having positive, negative, positive, positive, and positive refractive powers, and an interval between adjacent lens units is changed during zooming.

In the zoom lens for a monitoring camera, near-infrared light is used in most cases in imaging at night. However, there are cases where a sufficient amount of light cannot be obtained from the near-infrared light, for example, when there is very little moonlight around the time of a new moon and when the moon is hidden by a cloud. In the meantime, light called nightglow (peak wavelength of 1.6 μm) is emitted when hydroxide ions in an atmosphere are excited by the sunlight. With the use of this light, favorable imaging can be achieved with ease even when there is no moonlight.

In the zoom lens for a monitoring camera, in order to obtain favorable optical characteristics over a broad wavelength range from a visible range to a near-infrared range while achieving a higher zoom ratio, it is important to appropriately set the zoom type and the lens configuration of each lens unit. For example, in a zoom lens that includes three or more lens units including, in order from the object side to the image side, first to third lens units having positive, negative, and positive refractive powers, it is important to appropriately set materials for the lenses configuring the first lens unit or the lenses configuring the second lens unit.

SUMMARY OF THE INVENTION

According to one embodiment of the present invention, there is provided a zoom lens, including, in order from an object side to an image side: a first lens unit having a positive refractive power; a second lens unit having a negative refractive power; and a third lens unit having a positive refractive power, in which the second lens unit is configured to move toward the image side during zooming from, a wide angle end to a telephoto end, and an interval between adjacent lens units is changed during zooming, in which the first lens unit includes a lens pair (LB1) of a positive lens (LP1) and a negative lens (LN1) that are arranged adjacent to each other, and in which the following conditional expression is satisfied:

$$0.000 < (\theta IRP1 - \theta IRN1)/(\nu IRP1 - \nu IRN1) < 0.015$$

where, when a refractive index of a material at a wavelength of 400 nm is N400, a refractive index of a material at a wavelength of 1,050 nm is N1050, a refractive index of a material at a wavelength of 1,700 nm is N1700, an Abbe number νIR of a material and a partial dispersion ratio θIR of a material are νIR=(N1050−1)/(N400−N1700) and θIR=(N400−N1050)/(N400−N1700), νIRP1 and θIRP1 represent an Abbe number and a partial dispersion ratio of a material for the positive lens (LP1), respectively, and νIRN1 and θIRN1 represent an Abbe number and a partial dispersion ratio of a material for the negative lens (LN1), respectively.

Farther features of the present invention will become apparent from the following description of exemplary embodiments with reference to the attached drawings.

BRIEF DESCRIPTION OF THE DRAWINGS

FIG. 2A is a diagram for showing aberrations at the wide angle end of the zoom lens of Example 1.

FIG. 2B is a diagram for showing aberrations at a telephoto end of the zoom lens of Example 1.

DESCRIPTION OF THE EMBODIMENTS

Preferred embodiments of the present invention will now be described in detail in accordance with the accompanying drawings.

Now, a zoom lens and an image pickup apparatus including the same of the present invention are described. The zoom lens of the present invention includes, in order from an object side to an image side, a first lens unit having a positive refractive power, a second lens unit having a negative refractive power, and a third lens unit having a positive refractive power. The second lens unit is configured to move toward the image side during zooming from a wide angle end to a telephoto end. In addition, an interval between adjacent lens units is changed during zooming.

Figure 1:
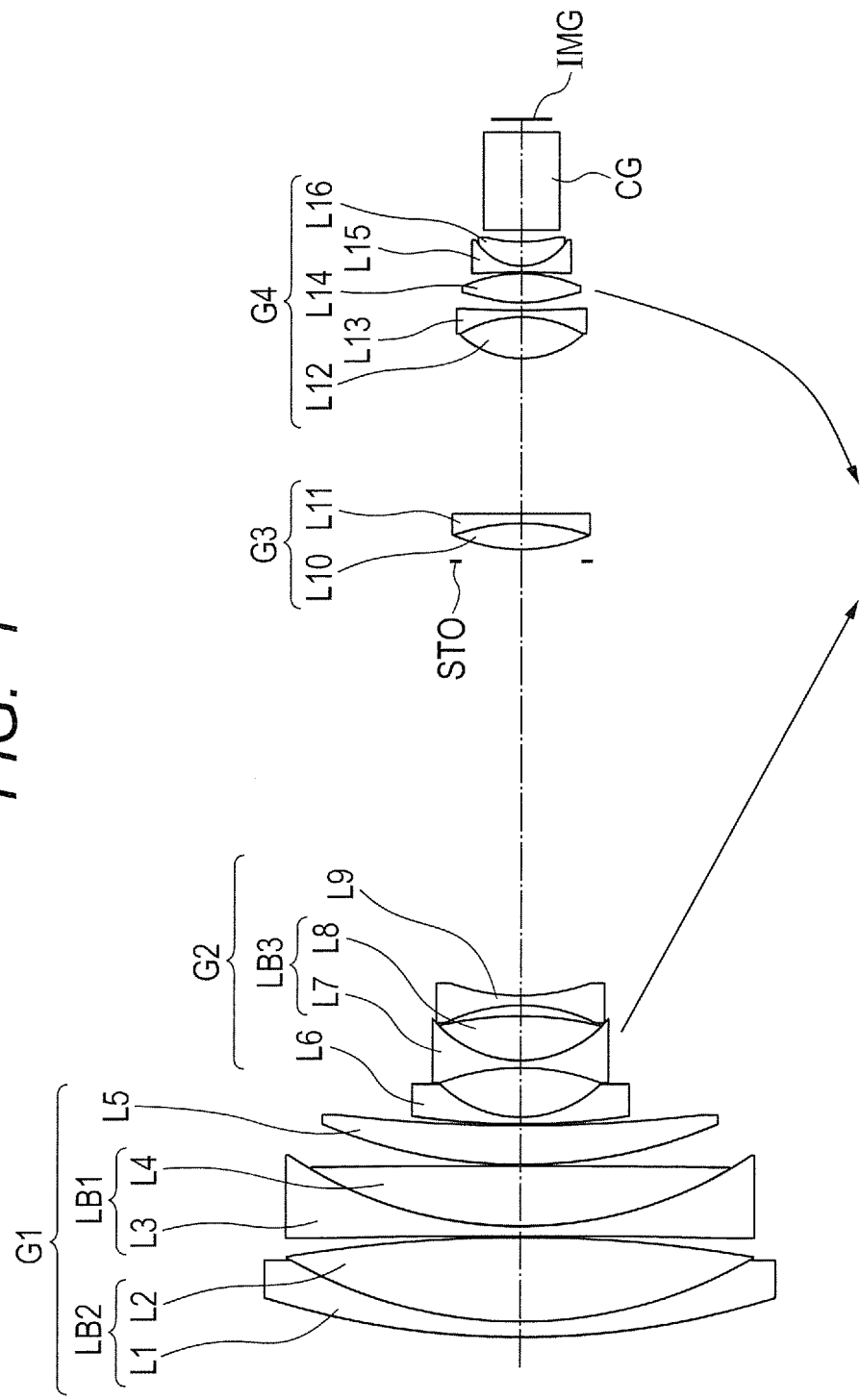
FIG. 1 is a lens cross-sectional view of a zoom lens at a wide angle end according to Example 1 of the present invention.

FIG. 1 is a lens cross-sectional view at the wide angle end (short focal length end) of a zoom lens according co Example 1 of the present invention. FIGS. 2A and 2B are aberration diagrams at the wide angle end and the telephoto end (long focal length end), respectively, of the zoom lens of Example 1. The optical magnification of the zoom lens of Example 1 is 19.8 (zoom ratio of 19.8), and a wavelength range in which the zoom lens is corrected for aberrations is from 400 nm to 1,700 nm.

Figure 3:
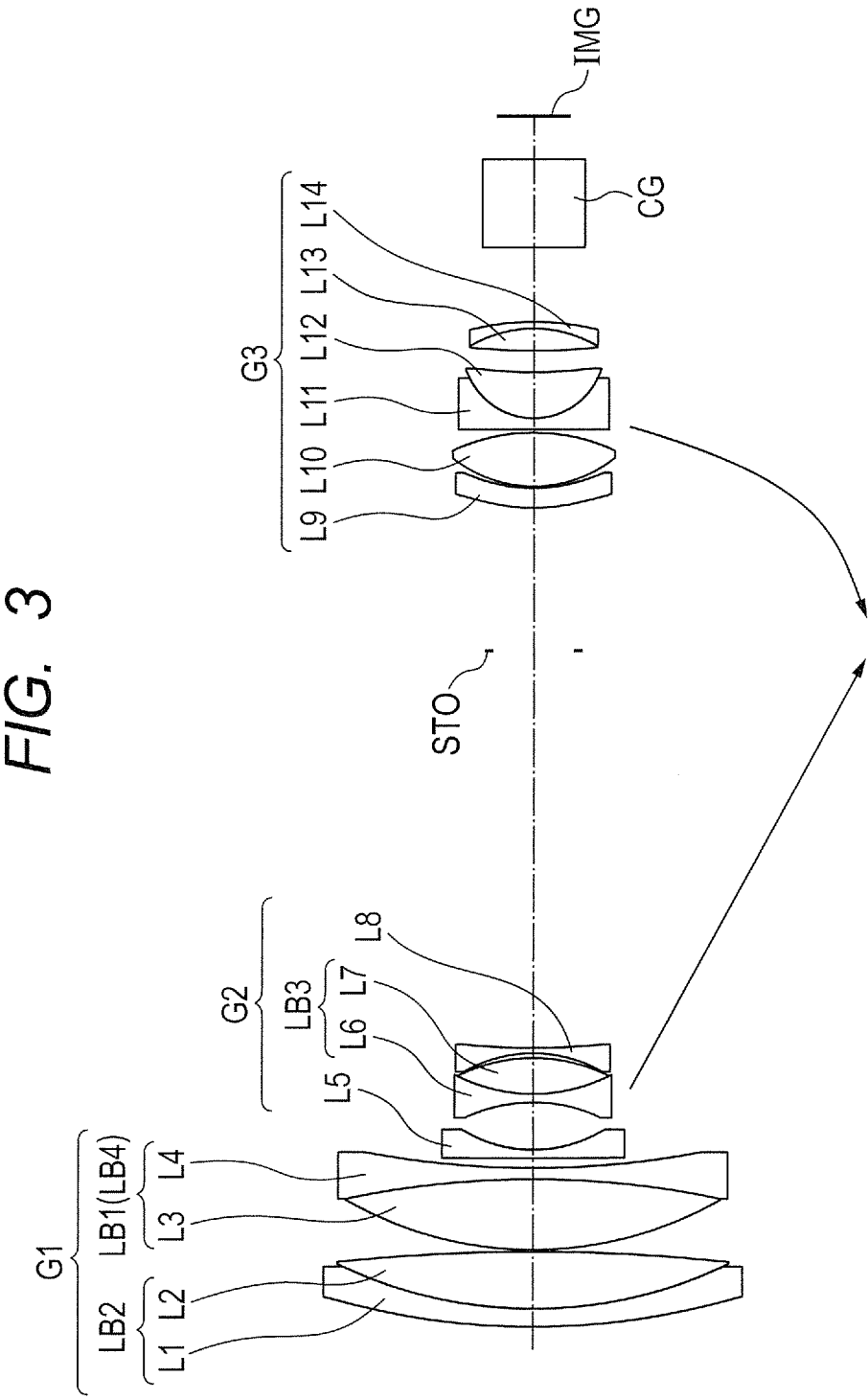
FIG. 3 is a lens cross-sectional view of a zoom lens at a wide angle end according to Example 2 of the present invention.
Figure 4:
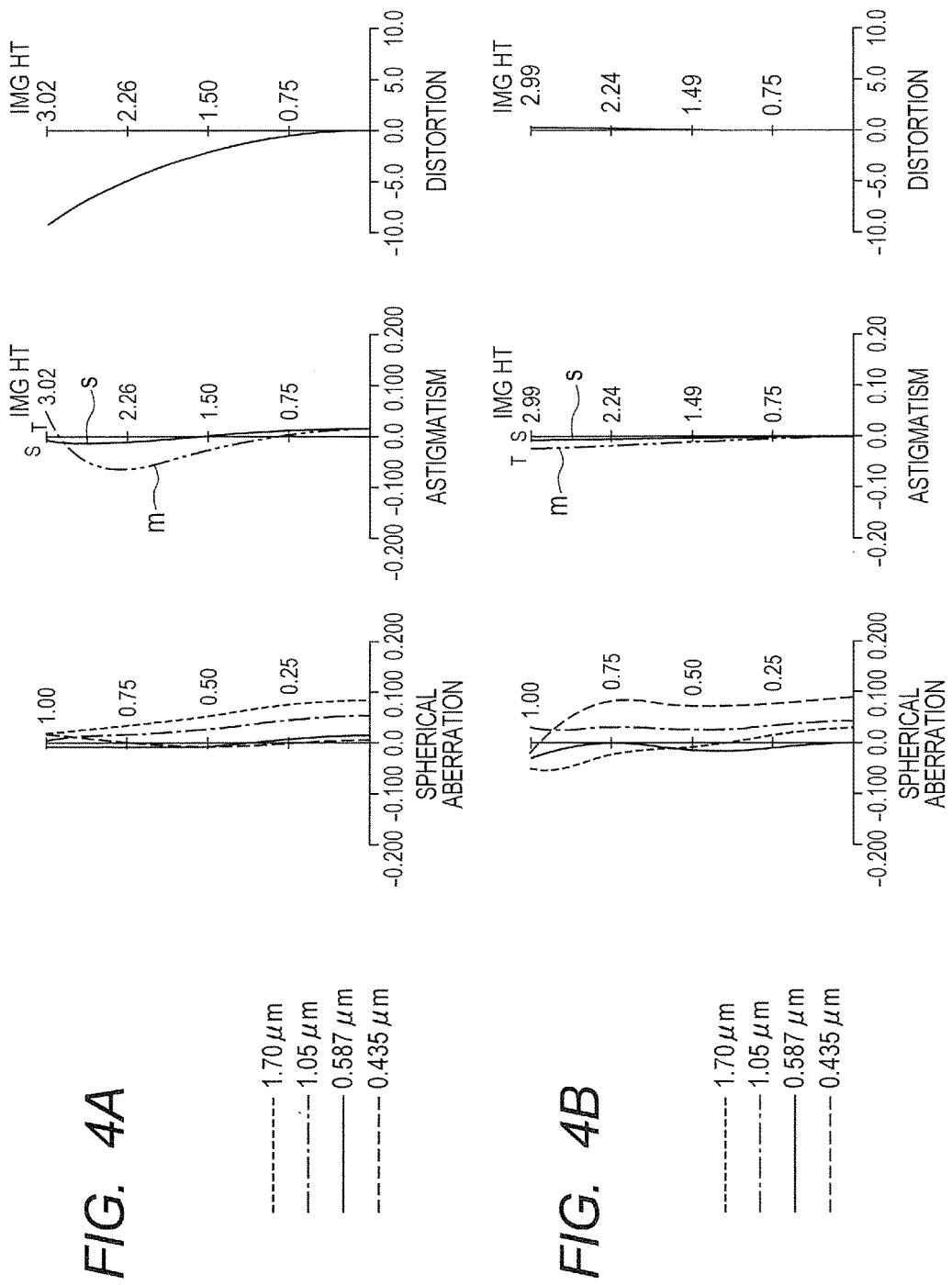
FIG. 4A is a diagram for showing aberrations at the wide angle end of the zoom lens of Example 2.
FIG. 4B is a diagram for showing aberrations at a telephoto end of the zoom lens of Example 2.

FIG. 3 is a lens cross-sectional view at the wide angle end of a zoom lens according to Example 2 of the present invention. FIGS. 4A and 4B are aberration diagrams at the wide angle end and the telephoto end, respectively, of the zoom lens of Example 2. The optical magnification of the zoom lens of Example 2 is 14.6, and a wavelength range in which the zoom lens is corrected for aberrations is from 400 nm to 1,700 nm.

Figure 5:
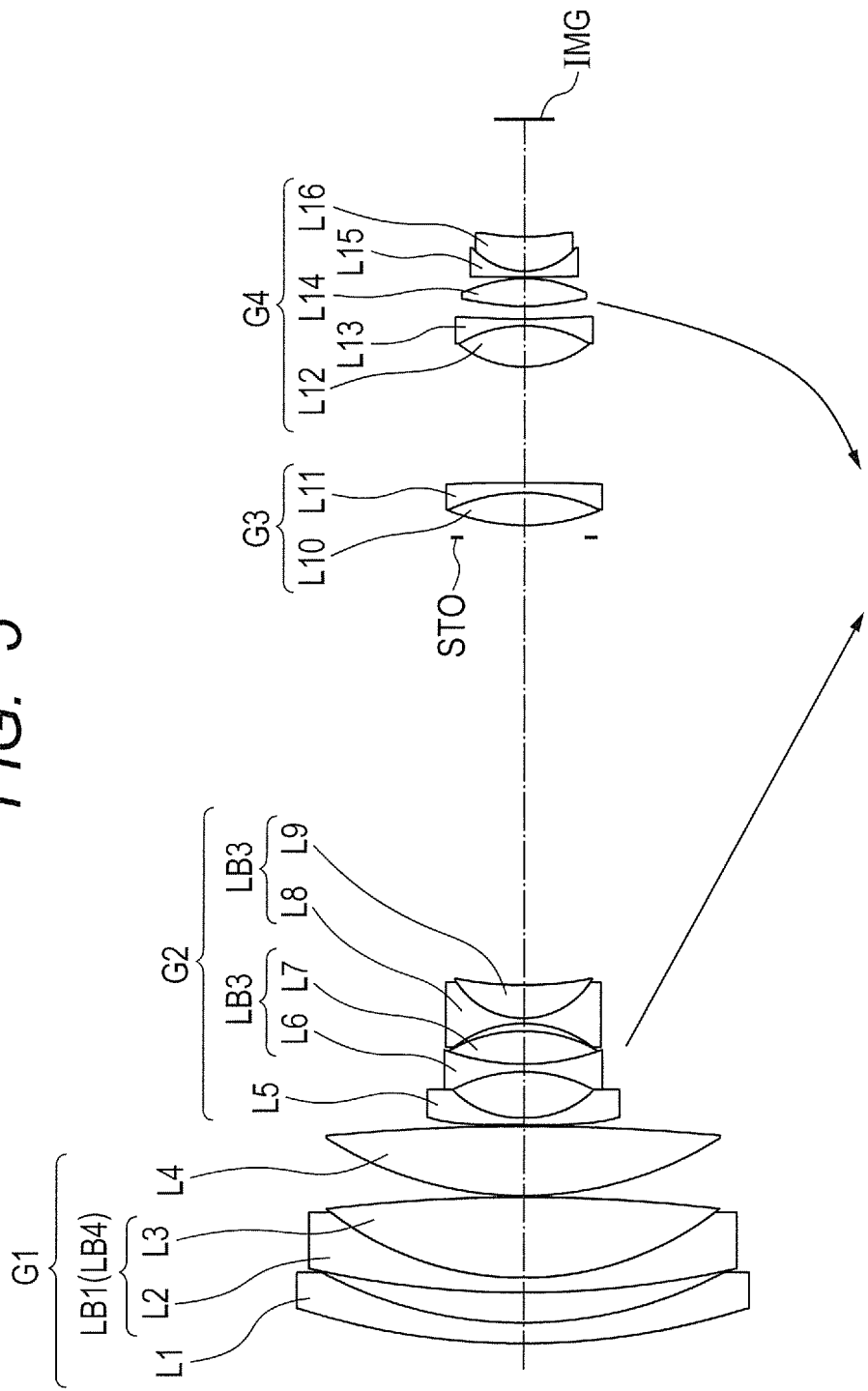
FIG. 5 is a lens cross-sectional view of a zoom lens at a wide angle end according to Example 3 of the present invention.
Figure 6:
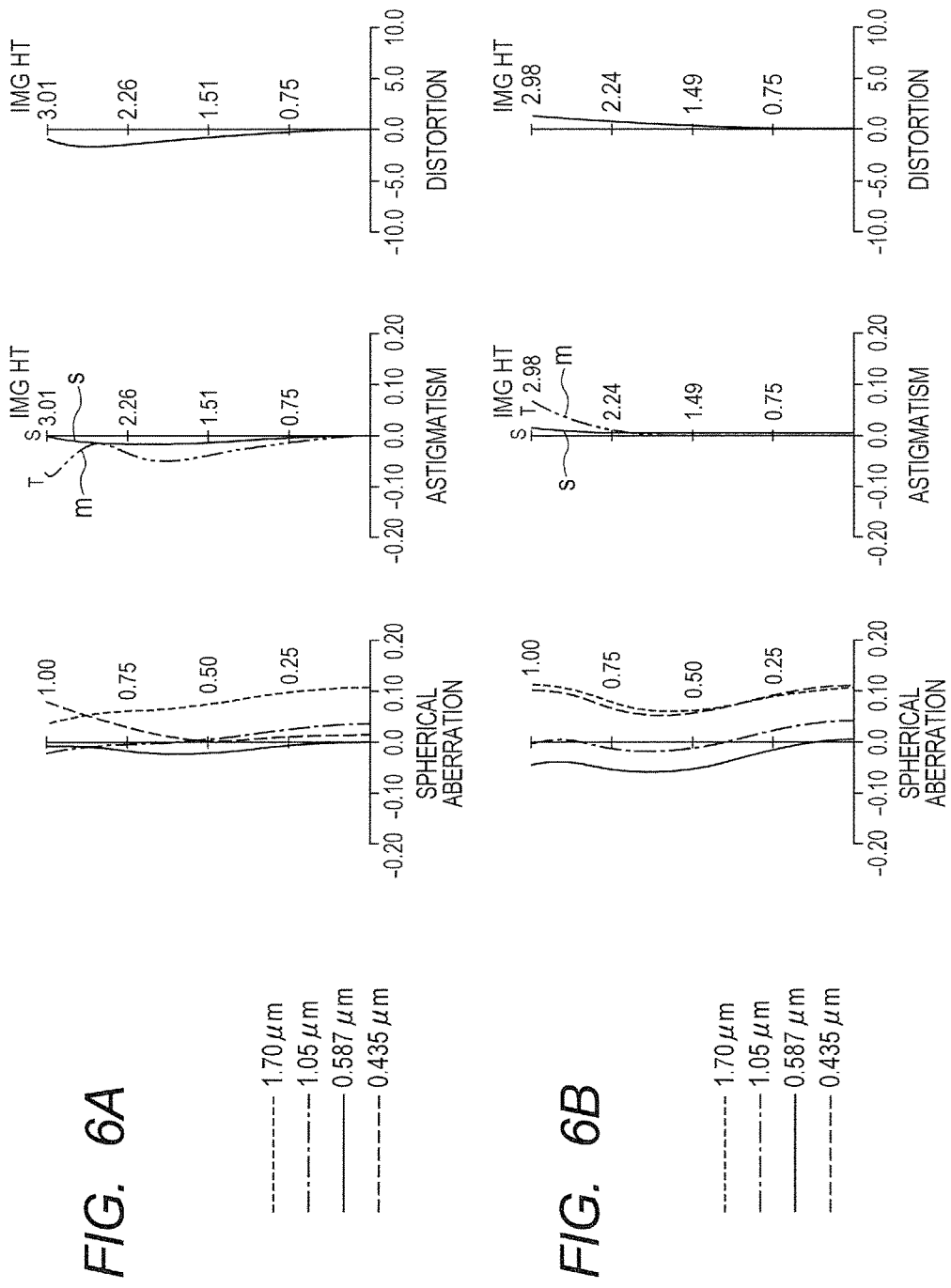
FIG. 6A is a diagram for showing aberrations at the wide angle end of the zoom lens of Example 3.
FIG. 6B is a diagram for showing aberrations at a telephoto end of the zoom lens of Example 3.

FIG. 5 is a lens cross-sectional view at the wide angle end of a zoom lens according to Example 3 of the present invention. FIGS. 6A and 6B are aberration diagrams at the wide angle end and the telephoto end, respectively, of the zoom lens of Example 3. The optical magnification of the zoom lens of Example 3 is 19.8, and a wavelength range in which the zoom lens is corrected for aberrations is from 400 nm to 1,700 nm.

Figure 7:
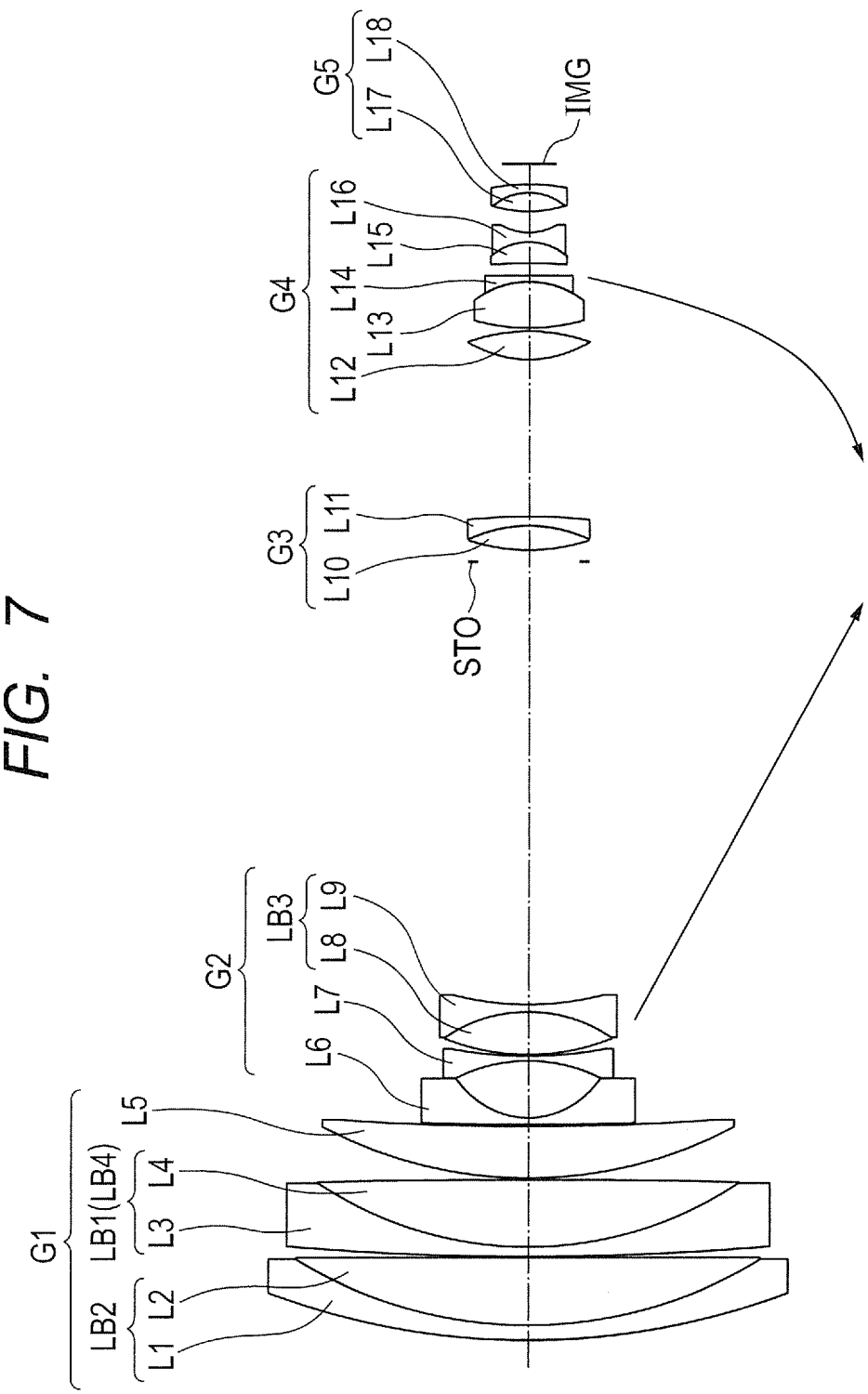
FIG. 7 is a lens cross-sectional view of a zoom lens at a wide angle end according to Example 4 of the present invention.
Figure 8A:
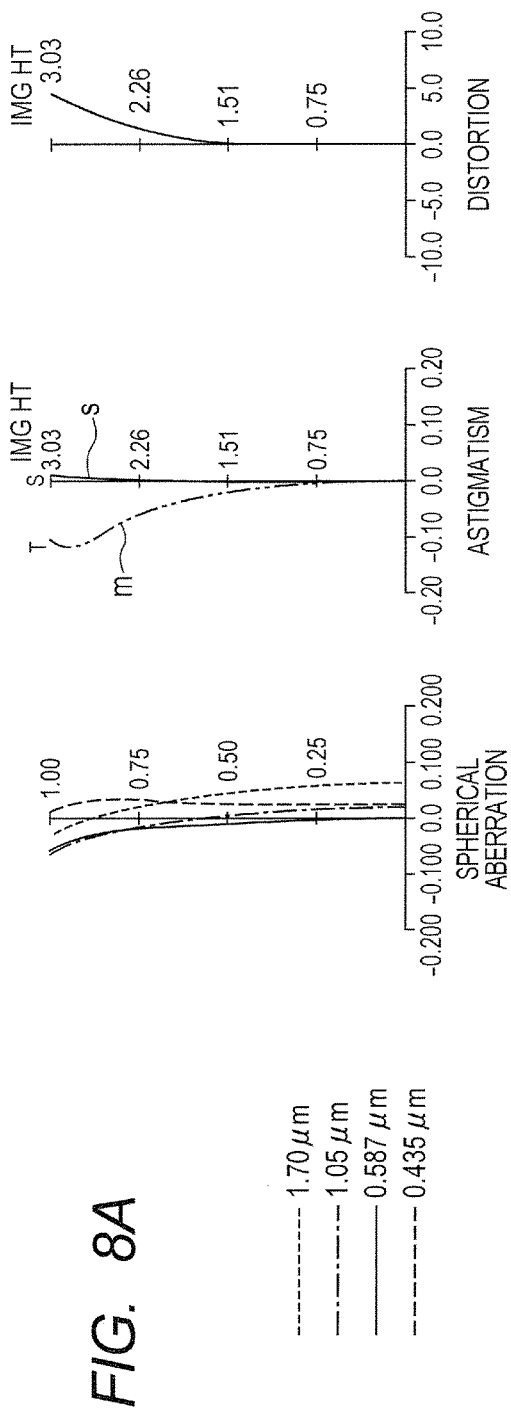
FIG. 8A is a diagram for showing aberrations at the wide angle end of the zoom lens of Example 4.
Figure 8B:
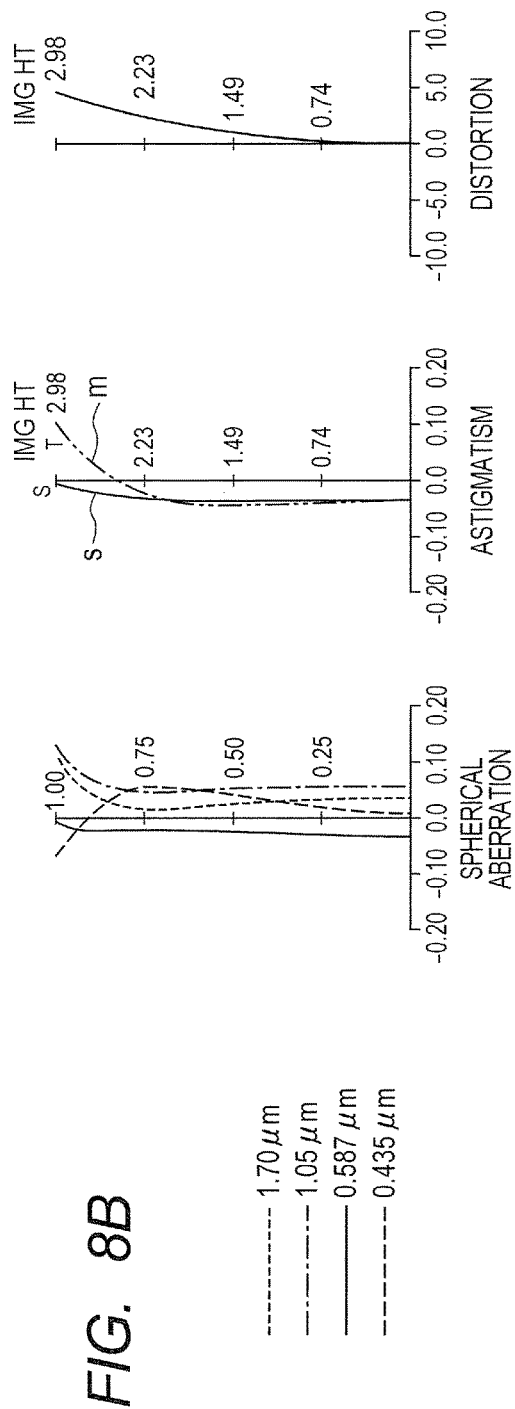
FIG. 8B is a diagram for showing aberrations at a telephoto end of the zoom lens of Example 4.

FIG. 7 is a lens cross-sectional view at the wide angle end of a zoom lens according to Example 4 of the present invention. FIGS. 8A and 8B are aberration diagrams at the wide angle end and the telephoto end, respectively, of the zoom lens of Example 4. The optical magnification of the zoom lens of Example 4 is 25.0, and a wavelength range in which the zoom lens is corrected for aberrations is from 400 nm to 1,700 nm.

Figure 9:
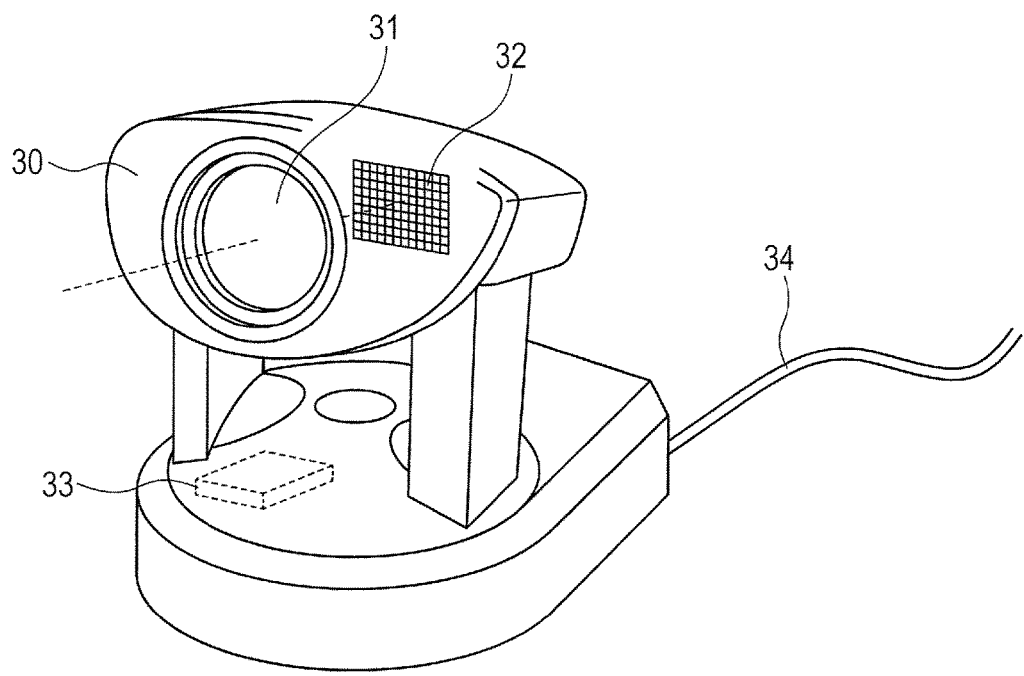
FIG. 9 is a schematic view of a main part of a monitoring camera (image pickup apparatus) according to the present invention.

FIG. 9 is a schematic view of a main part of the image pickup apparatus according to the present invention. The zoom lens according to each of the examples is used in the image pickup apparatus. In the lens cross-sectional views, the lens side corresponds to the object side (front side), and the right side corresponds to the image side (rear side). In the lens cross-sectional views, a first lens unit G1 has a positive refractive power, a second lens unit G2 has a negative refractive power, a third lens unit G3 has a positive refractive power, a fourth lens unit G4 has a positive refractive power, and a fifth lens unit G5 tics a positive refractive power.

An F number determination member (hereinafter referred to also as "aperture stop") STO has a function of aperture stop for determining (limiting) a maximum F number (Fno) light flux. An optical, block CG corresponds to an optical filter, a face plate, a crystal low pass filter, an infrared cut filter, or the like.

As an image plane IMG, an image pickup surface of a solid-state image pickup element (photo-electric conversion element) such as a CCD sensor and a CMOS sensor is arranged, when the zoom lens is used as an image pickup optical, system of a video camera and a digital still camera. The arrows indicate movement loci of the respective lens units during zooming from the wide angle end to the telephoto end. In each of the examples, focusing from infinity to a near field is carried out by feeding out the first lens unit G1 toward the object side.

An aberration diagram is shown in units of millimeters, and in a spherical aberration diagram, aberrations at a wavelength of 1, 700 nm, (1.70 µm), a wavelength of 1,050 nm (1.05 µm), a wavelength or 587 nm (0.587 m) (d-line), and a wavelength of 435 nm (0.435 µm) (g-line) are indicated. In an astigmatism diagram, symbol m represents a meridional image plane of the d-line, and symbol ε represents a sagittal image plane of the d-line. Note that, in the following examples, the wide angle end and the telephoto end refer to zoom positions obtained when a lens unit for varying the magnification (second lens unit G2) is located at respective ends of a range on a mechanism in which the stated lens unit can move along an optical axis. Unless otherwise indicated, the description is herein based on a premise that the lens structures are arranged in order from the object side to the image side.

The zoom lens according to the present invention includes, in order from the object side to the image side; the first lens unit G1 Paving a positive refractive power; the second lens unit G2 having a negative refractive power; and the third lens unit G3 having a positive refractive power. The second lens unit G2 is configured to move from the object side toward the image side along the optical axis during zooming from the wide angle end to the telephoto end.

The first lens unit G1 includes a lens pair LB1 of a positive lens LP1 and a negative lens LN1 that are arranged adjacent to each other. A refractive index of a material at a wavelength of 400 nm is N400, a refractive index of a material at a wavelength of 1,050 nm is N1050, a refractive index of a material at a wavelength of 1,700 nm is N1700, and an Abbe number vIR of a material and a partial dispersion ratio θIR of a material are vIR=(N1050−1)/(N400−N1700) and θIR=(N400−N1050)/(N400−1700).

An Abbe number and a partial dispersion ratio of a material for the positive lens LP1 are represented by vIRP1 and θIRP1, respectively, and an Abbe number and a partial dispersion ratio of a material for the negative lens LN1 are represented by vIRN1 and θIRN1, respectively. At this time, the following conditional expression is satisfied.

$$0.000 < (\theta IRP1 - \theta IRN1)/(vIRP1 - vIRN1) < 0.015 \quad (1)$$

Conditional Expression (1) relates to the material for each lens in the lens pair LB1, which is included in the first lens unit G1 and is made up of the positive lens LP1 and the negative lens LN1 that are adjacent to each other. Conditional Expression (1) represents an index of a secondary spectrum of an axial chromatic aberration at a wavelength of 1,050 nm, which is generated when axial chromatic aberrations at a wavelength of 400 nm and a wavelength of 1,700 nm are corrected by the positive lens LP1 and the negative lens LN1.

The index of the secondary spectrum of the axial chromatic aberration represented by Conditional Expression (1), which corrects the axial chromatic aberrations by using a lens pair of a positive lens and a negative lens formed of a general material, has a negative value. Accordingly, the secondary spectrum of the axial chromatic aberration is canceled out when the lens pair LB1 of the positive lens LP1 and the negative lens LN1 that satisfy Conditional Expression (1) is arranged in the lens unit G1 in which the axial chromatic aberration is corrected by a general material. Thus, the axial chromatic aberration is corrected favorably across a broad wavelength range from a visible range to a near-infrared range.

It is more preferred to satisfy at least one of the following conditional expressions in each of the examples. The first lens unit G1 includes a lens pair LB2 of a positive lens LP2 and a negative lens LN2 that are arranged adjacent to each other. The Abbe number and the partial dispersion ratio of the material for the positive lens LP2 are represented by vIRP2 and θIRP2, respectively, and the Abbe number and the partial dispersion ratio of the material for the negative lens LN2 are represented by vIRN2 and θIRN2, respectively. The second lens unit G2 includes a lens pair LB3 of a positive lens LP3 and a negative lens LN3 that are arranged adjacent to each other.

The Abbe number and the partial, dispersion ratio of the material for the positive lens LP3 are represented by vIRP3 and θIRP3, respectively, and the Abbe number and the partial dispersion ratio of the material for the negative lens LN3 are represented by vIRN3 and θIRN3, respectively. The focal length of the first tens unit at a wavelength of 1,050 nm is represented by F1M, and the focal length of the first lens unit at a wavelength of 1,700 nm is represented by F1L. The first lens unit G1 includes a lens pair LB4 of a positive lens LP4 and a negative lens LN4 that are arranged adjacent to each other. The refractive index of the material at a wavelength of 486 nm is represented by NF, the refractive index of the material at a wavelength of 587.6 nm is represented by Nd, the refractive index of the material at a wavelength of 656 nm is represented by Nc, and the Abbe number vd of the material is expressed by vd=(Nd-1)/(NF-Nc).

The Abbe number of the material for the positive lens LP4 is represented by vdP4, and the Abbe number of the material for the negative lens LN4 is represented by vdN4. The focal length of the first lens unit G1 at a wavelength of 1,050 nm is represented by F1M, and the focal length of the zoom lens at the telephoto end at a wavelength of 1,050 nm is represented by FTM. At this time, it is preferred to satisfy at least one of the following conditional expressions.

$$-0.015<(\theta IRP2-\theta IRN2)/(vIRP2-vIRN2)<0.000 \quad (2)$$

$$-0.005 \leq (\theta IRP3-\theta IRN3)/(vIRP3-vIRN3)<0.015 \quad (3)$$

$$-0.005<(F1L-F1M)/F1M<0.005 \quad (4)$$

$$65.0<vdP4 \quad (5)$$

$$50.0<vdN4 \quad (6)$$

$$0.5<F1M/FTM<1.0 \quad (7)$$

Next, the technical meanings of each of the conditional expressions described above are described. Conditional Expression (2) relates to the material for each lens in the lens pair LB2, which is included in the first lens unit G1 and is made up of the positive lens LP2 and the negative lens LN2 that are adjacent to each other. When the ratio falls below the lower limit or exceeds the upper limit of Conditional Expression (2), it becomes difficult to correct the secondary spectrum of the axial chromatic aberration generated by the first lens unit G1, and the imaging performance deteriorates.

Conditional Expression (3) relates to the material for each lens in the lens pair LB3, which is included in the second lens unit G2 and is made up of the positive lens LP3 and the negative lens LN3 that are adjacent to each other. When the ratio falls below the lower limit or exceeds the upper limit of Conditional Expression (3), the secondary spectrum of the axial chromatic aberration generated by the second lens unit G2 increases, and a variation of chromatic aberration during zooming increases. Thus, it becomes difficult to achieve a higher zoom ratio.

Conditional Expression (4) relates to the focal length of the first lens unit G1 at a wavelength of 1,050 nm and to the focal length of the first lens unit G1 at a wavelength of 1,700 nm. Conditional Expression (4) is an index for estimating the amount of axial chromatic aberration in a near-infrared range generated by the first lens unit G1. When the ratio falls below the lower limit or exceeds the upper limit of Conditional Expression (4), the secondary spectrum of the axial chromatic aberration is generated in a large amount at the telephoto end by the first lens unit G1, and the imaging performance deteriorates.

Conditional Expressions (5) and (6) relate to the material for each lens in the lens pair LB4, which is included in the first lens unit G1 and is made up of the positive lens LP4 and the negative lens LN4 that are adjacent to each other. When the values fall below the lower limit of Conditional Expressions (5) and (6), the axial chromatic aberration is generated in a large amount at the telephoto end by the first lens unit G1, and it becomes difficult to correct this aberration.

Conditional Expression (7) relates to the ratio of the focal length of the first lens unit G1 at a wavelength of 1,050 nm to the focal length of the zoom lens at the telephoto end at a wavelength of 1,050 nm. When the ratio falls below the lower limit of Conditional Expression (7) so that the focal length of the first lens unit G1 becomes too short, it becomes difficult to correct various aberrations. In addition, when the ratio exceeds the upper limit of Conditional Expression (7) so that the focal length of the first lens unit G1 becomes too long, the total lens length becomes too long, and it becomes difficult to reduce the size of the zoom lens.

As described above, according to the present invention, a zoom lens that is favorably corrected for various aberrations across a broad wavelength range from a visible range to a near-infrared range is obtained.

In each of the examples, it is more preferred to set the numerical ranges of Conditional Expressions (1) to (7) as follows.

$$0.002<(\theta IRP1-\theta IRN1)/(vIRP1-vIRN1)<0.014 \quad (1a)$$

$$-0.010<(\theta IRP2-\theta IRN2)/(vIRP2-vIRN2)<-0.002 \quad (2a)$$

$$-0.005 \leq (\theta IRP3-\theta IRN3)/(vIRP3-vIRN3)<0.010 \quad (3a)$$

$$-0.003<(F1L-F1M)/F1M<0.004 \quad (4a)$$

$$70.0<vdP4 \quad (5a)$$

$$60.0<vdP4 \quad (6a)$$

$$0.6<F1M/FTM<0.9 \quad (7a)$$

In the zoom lens according to the present invention, when the lens pair of the positive lens and the negative lens that are adjacent to each other is formed of a cemented lens, it becomes even easier to favorably correct the chromatic aberration. In addition, an anti-reflection film for a broad wavelength range with a large number of layers becomes unnecessary. For example, it is preferred that the lens pair LB1 be formed of a cemented lens. In addition, it is preferred that the lens pair LB3 be formed of a cemented lens.

The zoom lens of Examples 1 and 3 includes, in order from the object side to the image side, the first lens unit having a positive refractive power, the second lens unit having a negative refractive power, the third lens unit having a positive refractive power, and the fourth lens unit having a positive refractive power. In addition, the second lens unit is configured to move toward the image side during zooming from the wide angle end to the telephoto end, and the forth lens unit is configured to move toward the object side during the zooming.

The zoom lens of Example 2 includes, in order from the object side to the image side, the first lens unit having a positive refractive power, the second lens unit having a negative refractive power, and the third lens unit having a positive refractive power. In addition, the second lens unit is configured to move toward the image side curing zooming from the wide angle end to the telephoto end, and the third lens unit is configured to move toward the object side during the zooming.

The zoom lens of Example 4 includes, in order from the object side to the image side, the first lens unit having a positive refractive power, the second lens unit having a negative refractive power, the third lens unit having a positive refractive power, the fourth lens unit having a positive refractive power, and the fifth lens unit having a positive refractive power. In addition, the second lens unit is configured to move toward the image side during zooming from the wide angle end to the telephoto end, and the fourth lens unit is configured to move toward the object side during the zooming.

Next, the lens structure in each of the examples is described.

Example 1

The lens structure of the zoom lens of Example 1 is described. The zoom lens of Example 1 includes the first lens unit G1 having a positive refractive power, the second lens unit G2 having a negative refractive power, the aperture stop STO that determines a predetermined aperture, the third lens unit G3 having a positive refractive power, and the fourth lens unit G4 having a positive refractive power. The optical block CG, such as a filter and a prism, is arranged between the fourth lens unit G4 and the image plane IMG. If this optical block CG is not necessary, the optical block CG can be omitted.

The first lens unit G1 includes a lens L1 having a negative refractive power (hereinafter simply referred so as a negative lens), a lens L2 having a positive refractive power (hereinafter simply referred to as a positive lens), a negative lens L3, a positive lens L4, and a positive lens L5, and the negative lens L1 and the positive lens L2 are cemented. In addition, the negative lens L3 and the positive lens L4 are cemented. The second lens unit G2 includes a negative lens L6, a negative lens L7, a positive lens L8, and a negative lens L9. The negative lens L7 and the positive lens L8 are cemented.

The third lens unit G3 includes a positive lens L10 and a negative lens L11. The positive lens L10 and the negative lens L11 are cemented. The fourth lens unit G4 includes a positive lens L12, a negative lens L13, a positive lens L14, a negative lens L15, and a positive lens L16. The positive lens L12 and the negative lens L13 are cemented. In addition, she negative lens L15 and the positive lens L16 are cemented. Both lens surfaces of the positive lens L14 have an aspherical shape.

During zooming, the second lens unit G2 and the fourth lens unit G4 are configured to move in an optical axis direction. Specifically, when the second lens unit G2 is moved along the optical axis, the magnification is varied, and a variation in the image plane associated therewith is corrected by moving the fourth lens unit G4. The values of the lens pairs and the lenses related to each of the conditional expressions are as indicated in Table 1.

Example 2

The lens structure of the zoom lens of Example 2 is described. The zoom lens of Example 2 includes the first lens unit G1 having a positive refractive power, the second lens unit G2 having a negative refractive power, the aperture stop STO that determines a predetermined aperture, and the third lens unit G3 having a positive refractive power. The optical block CG is arranged between the third lens unit G3 and the image plane IMG. If this optical block CG is not necessary, the optical block CG can be omitted.

The first lens unit G1 includes a negative lens L1, a positive lens L2, a positive lens L3, and a negative lens L4. The negative lens L1 and the positive lens L2 are cemented. In addition, the negative lens L3 and the positive lens L4 are cemented. The second lens unit G2 includes a negative lens L5, a negative lens L6, a positive lens L7, and a negative lens L8. The negative lens L6 and the positive lens L7 are cemented. The third lens unit G3 includes a negative lens L9, a positive lens L10, a negative lens L11, a positive lens L12, a positive lens L13, and a negative lens L14. The negative lens L11 and the positive lens L12 are cemented.

In addition, the positive lens L13 and the negative lens L14 are cemented. Both lens surfaces of the negative lens L9 have an aspherical shape. During zooming, the second lens unit G2 and the third lens unit G3 are configured to move in the optical axis direction. Specifically, when the second lens unit G2 is moved along the optical axis, the magnification is varied, and a variation in the image plane associated therewith is corrected by moving the third lens unit G3. The values of the lens pairs and the lenses related to each of the conditional expressions are as indicated in Table 1.

Example 3

The lens structure of the zoom lens of Example 3 is described. The zoom lens of Example 3 includes the first lens unit G1 having a positive refractive power, the second lens unit G2 having a negative refractive power, the aperture stop STO that determines a predetermined aperture, the third lens unit G3 having a positive refractive power, and the fourth lens unit G4 having a positive refractive power. The first lens unit G1 includes a negative lens L1, a negative lens L2, a positive lens L3, and a positive lens L4. The negative lens L2 and the positive lens L3 are cemented.

The second lens unit G2 includes a negative lens L5, a negative lens L6, a positive lens L7, a negative lens L8, and a positive lens L9. The negative lens L6 and the positive lens L17 are cemented. In addition, the negative lens L8 and the positive lens L9 are cemented. Both lens surfaces of the negative lens L5 have an aspherical shape. The third lens unit G3 includes a positive lens L10 and a negative lens L11. The positive lens L10 and she negative lens L11 are cemented.

The fourth lens unit G4 includes a positive lens L12, a negative lens L13, a positive lens L14, a negative lens L15, and a positive lens L16. The positive lens L12 and the negative lens L13 are cemented. In addition, the negative lens L15 and the positive lens L16 are cemented. Both lens surfaces of the positive lens L14 have an aspherical shape. During zooming, the second lens unit G2 and she fourth lens unit G4 are configured to move in she optical axis direction. Specifically, when the second lens unit G2 is moved along the optical axis, she magnification is varied, and a variation in the image plane associated therewith is corrected by moving the fourth lens unit G4. The values of the lens pairs and the lenses related to each of the conditional expressions are as indicated in Table 1.

Example 4

The lens structure of the zoom lens of Example 4 is described. The zoom lens of Example 4 includes the first lens unit G1 having a positive refractive power, the second lens unit G2 having a negative refractive power, the aperture stop STO that determines a predetermined aperture, the third lens unit G3 having a positive refractive power, the fourth lens unit G4 having a positive refractive power, and the fifth lens unit G5 having a positive refractive power. The first lens unit G1 includes a negative lens L1, a positive lens L2, a negative lens L3, a positive lens L4, and a positive lens L5. The negative lens L1 and the positive lens L2 are cemented. In addition, the negative lens L3 and the positive lens L4 are cemented.

The second lens unit G2 includes a negative lens L6, a negative lens L7, a positive lens L8, and a negative lens L9. The positive lens L8 and the negative lens L9 are cemented. Both lens surfaces of the negative lens L6 have an aspherical shape. The third, lens unit G3 includes a positive lens L10 and a negative lens L11. The positive lens L10 and the negative lens L11 are cemented. The fourth lens unit G4 includes a positive lens L12, a positive lens L13, a negative lens L14, a positive lens L15, and a negative lens L16. The positive lens L13 and the negative lens L14 are cemented.

In addition, the positive lens L15 and the negative lens L16 are cemented. Both lens surfaces of the positive lens L12 have an aspherical shape. The fifth lens unit G5 includes a positive lens L17 and a negative lens L18. The positive lens L17 and the negative lens L18 are cemented. Daring zooming, the second lens unit G2 and the fourth lens unit G4 are configured to move in the optical axis direction. Specifically, when the second lens unit. G2 is moved alone the optimal axis, the magnification is varied, and a variation in the image plane associated therewith is corrected by moving the fourth lens unit G4.

Although the exemplary examples of the present invention have been described so far, the present invention is by no means limited to those examples, and hence various changes and modifications can be made within the scope of the subject matter of the present invention. For example, the zoom lens corrected for the chromatic aberration within a wavelength range from a wavelength of 400 nm to a wavelength of 1,700 nm has been described in the examples of the present invention, but the correction wavelength range is not limited, and the present invention can be similarly applied to a zoom lens with a narrower or broader correction wavelength range. In addition, the first lens unit G1 is configured not to move during zooming in each of the examples, but even when a configuration in which the first lens unit G1 is moved is adopted, the effect of the present invention can be obtained.

Now, numerical examples in the respective examples are shown. In each of the numerical examples, a surface number i is an optical surface counted in order from an object plane to an image plane. Symbol ri represents a curvature radius of the i-th optical surface. Symbol di represents an interval between the i-th optical surface and the (i+1)th optical surface (the positive sign is assigned when the interval is measured from the object side to the image plane side (when the light approaches), and the negative sign is assigned for the opposite direction). Symbols Ndi and vdi represent the refractive index and the Abbe number of the material at a wavelength of 587.6 nm (d-line), respectively. The focal length is a value at a wavelength of 587.6 nm.

The aspherical shape is expressed through a general aspherical expression as in the following expression. In the following expression, symbol Z represents a coordinate in the optical axis direction, symbol c represents a curvature (inverse of curvature radius r), symbol h represents a height from the optical axis, symbol k represents a conic constant, and symbols A, B, C, D, and E represent fourth-order, sixth order, eighth-order, tenth-order, and twelfth-order aspherical coefficients, respectively.

$$Z = \frac{ch^2}{1 + \sqrt{(1+k)c^2h^2}} + Ah^4 + Bh^6 + Ch^8 + Dh^{10} + Eh^{12}$$

Expression [E-X] means [10-x]. Symbol * means a surface having an aspherical shape. In addition, a relationship between each of the conditional expressions described above and the numerical examples is shown in Table 1.

Numerical Example 1

| Surface data | | | | |
| --- | --- | --- | --- | --- |
| Surface number | r | d | Nd | vd |
| 1 | 85.19 | 1.60 | 1.801 | 35.0 |
| 2 | 46.17 | 8.63 | 1.439 | 94.9 |
| 3 | −141.97 | 0.15 | | |
| 4 | −1,041.53 | 1.00 | 1.613 | 44.3 |
| 5 | 41.22 | 6.20 | 1.717 | 47.9 |
| 6 | −1,706.01 | 0.15 | | |
| 7 | 50.51 | 4.00 | 1.497 | 81.5 |
| 8 | 156.26 | d8 | | |
| 9 | 73.78 | 0.70 | 1.883 | 40.8 |

-continued

| | | | | |
|---|---|---|---|---|
| 10 | 11.40 | 5.08 | | |
| 11 | −21.86 | 0.75 | 1.497 | 81.5 |
| 12 | 11.46 | 4.54 | 1.801 | 35.0 |
| 13 | −34.09 | 1.10 | | |
| 14 | −16.89 | 1.00 | 1.439 | 94.9 |
| 15 | 20.25 | d15 | | |
| 16 (Stop) | ∞ | 1.20 | | |
| 11 | 17.15 | 2.68 | 1.497 | 81.5 |
| 18 | −20.35 | 1.00 | 1.648 | 53.0 |
| 19 | −1,352.33 | d19 | | |
| 20 | 9.08 | 4.26 | 1.497 | 81.5 |
| 21 | −12.32 | 0.70 | 1.772 | 49.6 |
| 22 | 81.27 | 0.80 | | |
| 23* | 12.93 | 3.00 | 1.583 | 59.4 |
| 24* | −12.30 | 0.15 | | |
| 25 | −66.82 | 0.60 | 1.694 | 53.2 |
| 26 | 5.39 | 2.50 | 1.439 | 94.9 |
| 27 | 13.86 | d27 | | |
| 28 | ∞ | 10.00 | 1.516 | 64.1 |
| 29 | ∞ | 1.33 | | |

Aspherical surface data

Surface number

| | | | | | |
|---|---|---|---|---|---|
| 23 | K = 0.00E+00 | A = −2.29E−04 | B = −1.90E−06 | C = −9.17E−08 | D = 2.39E−09 |
| | E = 0.00E+00 | | | | |
| 24 | K = 0.00E+00 | A = 3.08E−04 | B = −7.02E−06 | C = 1.12E−07 | D = −2.96E−10 |
| | E = 0.00E+00 | | | | |

Various data

| | Wide angle | Intermediate | Telephoto |
|---|---|---|---|
| Focal length | 4.8 | 21.4 | 95.1 |
| Fno | 1.8 | 3 | 3.5 |
| Image height | 3 | 3 | 3 |
| d8 | 0.15 | 29.67 | 44.04 |
| d15 | 44.61 | 15.09 | 0.72 |
| d19 | 15.91 | 9.35 | 0.15 |
| d27 | 1.19 | 7.75 | 16.95 |

Numerical Example 2

Surface data

| Surface number | r | d | Nd | νd |
|---|---|---|---|---|
| 1 | 65.96 | 1.60 | 1.801 | 35.0 |
| 2 | 39.52 | 5.22 | 1.439 | 94.9 |
| 3 | −160.57 | 0.15 | | |
| 4 | 33.18 | 6.44 | 1.497 | 81.5 |
| 5 | −78.57 | 1.00 | 1.487 | 70.2 |
| 6 | 79.91 | d6 | | |
| 7 | 901.89 | 0.75 | 1.883 | 40.8 |
| 8 | 11.99 | 4.31 | | |
| 9 | −14.02 | 0.75 | 1.497 | 81.5 |
| 10 | 14.98 | 3.26 | 1.804 | 39.6 |
| 11 | −14.98 | 0.42 | | |
| 12 | −12.45 | 0.50 | 1.497 | 81.5 |
| 13 | 58.33 | d13 | | |
| 14 (Stop) | ∞ | d14 | | |
| 15* | 15.88 | 1.80 | 1.583 | 59.4 |
| 16* | 14.70 | 0.15 | | |
| 17 | 11.56 | 4.87 | 1.497 | 81.5 |
| 18 | −17.03 | 0.32 | | |
| 19 | −491.32 | 1.00 | 1.583 | 59.4 |
| 20 | 6.37 | 4.17 | 1.497 | 81.5 |
| 21 | 38.61 | 2.00 | | |
| 22 | 58.10 | 2.02 | 1.497 | 81.5 |
| 23 | −10.99 | 0.60 | 1.834 | 37.2 |
| 24 | −23.37 | d24 | | |
| 25 | ∞ | 8.00 | 1.516 | 64.1 |
| 26 | ∞ | 3.95 | | |

Aspherical surface data

Surface number

| | | | | | |
|---|---|---|---|---|---|
| 15 | K = 0.00E+00 | A = −4.45E−05 | B = −2.95E−06 | C = −5.59E−09 | D = 4.52E−10 |
| | E = 0.00E+00 | | | | |
| 16 | K = 0.00E+00 | A = 5.95E−05 | B = −2.53E−06 | C = −9.19E−09 | D = 7.29E−10 |
| | E = 0.00E+00 | | | | |

Various data

| | Wide angle | Intermediate | Telephoto |
|---|---|---|---|
| Focal length | 6.5 | 24.8 | 95 |
| Fno | 3 | 3.25 | 3.5 |
| Image height | 3 | 3 | 3 |
| d6 | 0.89 | 23.35 | 36.39 |
| d13 | 35.93 | 13.48 | 0.43 |
| d14 | 13.22 | 7.06 | 0.17 |
| d24 | 6.68 | 12.84 | 19.74 |

Numerical Example 3

Surface data

| Surface number | r | d | Nd | νd |
|---|---|---|---|---|
| 1 | 73.46 | 2.10 | 1.801 | 35.0 |
| 2 | 42.53 | 3.10 | | |
| 3 | 96.08 | 1.50 | 1.487 | 70.2 |
| 4 | 31.35 | 8.28 | 1.439 | 94.9 |
| 5 | −164.50 | 0.15 | | |
| 6 | 36.39 | 7.09 | 1.497 | 81.5 |
| 7 | −207.10 | d7 | | |
| 8 | −178.56 | 0.70 | 1.851 | 40.1 |
| 9* | 12.08 | 4.72 | | |
| 10 | −14.60 | 0.75 | 1.516 | 64.1 |
| 11 | 22.63 | 3.39 | 1.801 | 35.0 |
| 12 | −14.98 | 0.78 | | |
| 13 | −11.25 | 0.50 | 1.439 | 94.9 |
| 14 | 8.04 | 3.40 | 1.487 | 70.2 |
| 15 | 36.87 | d15 | | |
| 16 (Stop) | ∞ | 1.20 | | |
| 17 | 20.03 | 3.33 | 1.497 | 81.5 |
| 18 | −17.42 | 1.00 | 1.618 | 63.3 |
| 19 | −211.26 | d19 | | |
| 20 | 10.47 | 4.22 | 1.497 | 81.5 |
| 21 | −12.69 | 0.70 | 1.772 | 49.6 |
| 22 | 78.70 | 1.30 | | |
| 23* | 18.75 | 2.83 | 1.583 | 59.4 |
| 24* | −12.94 | 0.15 | | |
| 25 | 230.54 | 0.60 | 1.772 | 49.6 |
| 26 | 6.95 | 3.50 | 1.439 | 94.9 |
| 27 | 21.7261 | d27 | | |

Aspherical surface data

Surface number

| | | | | | |
|---|---|---|---|---|---|
| 8 | K = 0.00E+00 | A = 2.76E−04 | B = −4.38E−06 | C = 4.18E−08 | D = −1.39E−10 |
| | E = 0.00E+00 | | | | |
| 9 | K = 0.00E+00 | A = 2.53E−04 | B = −1.18E−06 | C = −4.29E−08 | D = 1.00E−09 |
| | E = 0.00E+00 | | | | |
| 23 | K = 0.00E+00 | A = −1.82E−04 | B = −1.95E−06 | C = −2.37E−08 | D = 1.50E−09 |
| | E = 0.00E+00 | | | | |
| 24 | K = 0.00E+00 | A = 1.72E−04 | B = −4.03E−06 | C = 5.88E−08 | D = 3.02E−10 |
| | E = 0.00E+00 | | | | |

Various data

| | Wide angle | Intermediate | Telephoto |
|---|---|---|---|
| Focal length | 4.8 | 21.4 | 95 |
| Fno | 2 | 3.25 | 4 |
| Image height | 3 | 3 | 3 |

-continued

| | | | |
|---|---|---|---|
| d7 | 0.15 | 29.32 | 45.52 |
| d15 | 45.76 | 16.60 | 0.40 |
| d19 | 11.81 | 4.73 | 0.15 |
| d27 | 11.99 | 19.07 | 23.65 |

Numerical Example 4

| Surface data | | | | |
|---|---|---|---|---|
| Surface number | r | d | Nd | vd |
| 1 | 77.99 | 1.60 | 1.801 | 35.0 |
| 2 | 48.52 | 6.58 | 1.439 | 94.9 |
| 3 | 903.39 | 0.15 | | |
| 4 | 208.20 | 1.00 | 1.516 | 64.1 |
| 5 | 37.89 | 7.58 | 1.497 | 81.5 |
| 6 | −949.09 | 0.15 | | |
| 7 | 45.28 | 5.50 | 1.497 | 81.5 |
| 8 | 274.35 | d8 | | |
| 9* | −234.03 | 0.70 | 1.851 | 40.1 |
| 10* | 8.84 | 6.06 | | |
| 11 | −16.52 | 0.50 | 1.439 | 94.9 |
| 12 | 39.80 | 0.15 | | |
| 13 | 22.91 | 4.54 | 1.801 | 35.0 |
| 14 | −15.26 | 0.75 | 1.497 | 81.5 |
| 15 | 31.22 | d15 | | |
| 16 (Stop) | ∞ | 1.20 | | |
| 17 | 19.96 | 2.56 | 1.497 | 81.5 |
| 18 | −14.75 | 1.00 | 1.772 | 49.6 |
| 19 | −55.45 | d19 | | |
| 20* | 11.33 | 3.09 | 1.439 | 94.9 |
| 21* | −18.04 | 0.46 | | |
| 22 | 20.19 | 4.91 | 1.497 | 81.5 |
| 23 | −9.45 | 0.70 | 1.801 | 35.0 |
| 24 | −226.97 | 1.30 | | |
| 25 | −48.64 | 2.11 | 1.583 | 59.4 |
| 26 | −6.07 | 1.00 | 1.487 | 70.2 |
| 27 | 5.74 | d27 | | |
| 28 | 12.99 | 2.01 | 1.603 | 65.4 |
| 29 | −5.73 | 0.90 | 1.772 | 49.6 |
| 30 | −19.76 | 2.08 | | |

| Aspherical surface data | | | | | |
|---|---|---|---|---|---|
| Surface number | | | | | |
| 9 | K = 0.00E+00<br>E = 0.00E+00 | A = 8.70E−05 | B = −7.26E−07 | C = 1.87E−09 | D = 1.89E−12 |
| 10 | K = 0.00E+00<br>E = 0.00E+00 | A = 2.69E−05 | B = −4.72E−07 | C = 1.44E−08 | D = −4.97E−10 |
| 20 | K = 0.00E+00<br>E = 0.00E+00 | A = −4.67E−05 | B = −9.48E−07 | C = −8.32E−09 | D = 0.00E+00 |
| 21 | K = 0.00E+00<br>E = 0.00E+00 | A = 9.06E−05 | B = −1.63E−06 | C = 1.02E−08 | D = 0.00E+00 |

| Various data | | | |
|---|---|---|---|
| | Wide angle | Intermediate | Telephoto |
| Focal length | 4 | 20 | 100 |
| Fno | 1.8 | 3 | 3.5 |
| Image height | 3 | 3 | 3 |
| d8 | 0.21 | 30.34 | 46.16 |
| d15 | 47.24 | 17.11 | 1.29 |
| d19 | 16.56 | 9.12 | 0.15 |
| d27 | 2.32 | 9.76 | 18.73 |

TABLE 1

| Conditional Expression | | Example 1 | | Example 2 | | Example 3 | | Example 4 | |
|---|---|---|---|---|---|---|---|---|---|
| (1) | Lens Pair | LB1 | 0.0136 | LB1 | 0.0108 | LB1 | 0.0054 | LB1 | 0.0061 |
| | Lens | L3 L4 | | L3 L4 | | L2 L3 | | L3 L4 | |
| (2) | Lens Pair | LB2 | −0.0040 | LB2 | −0.0040 | LB2 | — | LB2 | −0.0040 |
| | Lens | L1 L2 | | L1 L2 | | — — | | L1 L2 | |
| (3) | Lens Pair | LB3 | −0.0046 | LB3 | −0.0043 | LB3 | −0.0143 | LB3 | −0.0046 |
| | Lens | L7 L8 | | L6 L7 | | L6 L7 | 0.0054 | L8 L9 | |
| | | | | | | L8 L9 | | | |
| (4) | F1M | 74.6878 | 0.0025 | 66.1828 | 0.0019 | 66.3532 | 0.0033 | 73.1072 | 0.0022 |
| | F1L | 74.8769 | | 66.311 | | 66.5725 | | 73.2719 | |
| (5) | Lens Pair | LB4 | — | LB4 | — | LB4 | — | LB4 | — |
| | Lens | — | — | L3 | 81.5 | L3 | 94.9 | L4 | 81.5 |
| (6) | Lens Pair | LB4 | — | LB4 | — | LB4 | — | LB4 | — |
| | Lens | — | — | L4 | 70.2 | L2 | 70.2 | L3 | 64.1 |
| (7) | FIM | 74.6878 | 0.79 | 66.1828 | 0.70 | 66.3532 | 0.70 | 73.1072 | 0.73 |
| | FTM | 94.8637 | | 94.9964 | | 94.9479 | | 99.4713 | |

Next, an example of a monitoring camera (image pickup apparatus) including the zoom lens of the present invention as an image pickup optical system is described with reference to FIG. 9. In FIG. 9, a monitoring camera main body 30 and an image pickup optical system 31 constructed with the zoom lens described in any one of Examples 1 to 4 are illustrated. A solid-state image pickup element 32 (photoelectric conversion element), such as a CCD sensor and a CMOS sensor, is embedded in the camera main body and receives a subject image formed by the image pickup optical systems 31.

A memory 33 records information corresponding to the subject image subjected to photoelectric conversion by the solid-state image pickup element 32. A network cable 34 is used to transfer the captured subject image subjected to photoelectric conversion by the solid-state image pickup element 32.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-214505, filed Oct. 21, 2014, which is hereby incorporated by reference herein in its entirety.

What is claimed is:

1. A zoom lens comprising, in order from an object side to an image side:
  a first lens unit having a positive refractive power;
  a second lens unit having a negative refractive power; and
  a third lens unit having a positive refractive power,
  wherein the second lens unit is configured to move toward the image side during zooming from a wide angle end to a telephoto end, and an interval between adjacent lens units is changed during zooming,
  wherein the first lens unit comprises a lens pair (LB1) of a positive lens (LP1) and a negative lens (LN1) that are arranged adjacent to each other, and a lens pair (LB2) of a positive lens (LP2) and a negative lens (LN2) that are arranged adjacent to each other,
  wherein the second lens unit comprises a lens pair (LB3) of a positive lens (LP3) and a negative lens (LN3) that are arranged adjacent to each other, and
  wherein the following conditional expressions are satisfied:

$0.000 < (\theta IRP1 - \theta IRN1)/(\nu IRP1 - \nu IRN1) < 0.015;$ $-0.015 < (\theta IRP2 - \theta IRN2)/(\nu IRP2 - \nu IRN2) < 0.000;$ and $-0.005 < (\theta IRP3 - \theta IRN3)/(\nu IRP3 - \nu IRN3) < 0.015,$ where, when a refractive index of a material at a wavelength of 400 nm is N400, a refractive index of the material at a wavelength of 1,050 nm is N1050, a refractive index of the material at a wavelength of 1,700 nm is N1700, an Abbe number $\nu IR$ of the material and a partial dispersion ratio $\theta IR$ of the material are $\nu IR=(N1050-1)/(N400-N1700)$ and $\theta IR=(N400-N1050)/(N400-N1700)$, respectively, $\nu IRP1$ and $\theta IRP1$ represent an Abbe number $\nu IR$ and a partial dispersion ratio $\theta IR$ of a first material for the positive lens (LP1), respectively, $\nu IRN1$ and $\theta IRN1$ represent an Abbe number $\nu IR$ and a partial dispersion ratio $\theta IR$ of a second material for the negative lens (LN1), respectively, $\nu IRP2$ and $\theta IRP2$ represent an Abbe number $\nu IR$ and a partial dispersion ratio $\theta IR$ of a third material for the positive lens (LP2), respectively, $\nu IRN2$ and $\theta IRN2$ represent an Abbe number $\nu IR$ and a partial dispersion ratio $\theta IR$ of a fourth material for the negative lens (LN2), respectively, $\nu IRP3$ and $\theta IRP3$ represent an Abbe number $\nu IR$ and a partial dispersion ratio $\theta IR$ of a fifth material for the positive lens (LP3), respectively, and $\nu IRN3$ and $\theta IRN3$ represent an Abbe number $\nu IR$ and a partial dispersion ration $\theta IR$ of a sixth material for the negative lens (LN3), respectively.

2. The zoom lens according to claim 1, wherein the lens pair (LB1) comprises a cemented lens.

3. The zoom lens according to claim 1, wherein the lens pair (LB3) comprises a cemented lens.

4. The zoom lens according to claim 1, wherein the following conditional expression is satisfied:

$-0.005 < (F1L - F1M)/F1M < 0.005,$ where F1M represents a focal length of the first lens unit at a wavelength of 1,050 nm, and F1L represents a focal length of the first lens unit at a wavelength of 1,700 nm.

5. The zoom lens according to claim 1, wherein the following conditional expressions are satisfied:

$65.0 < \nu dP4 \leq 94.9;$ and $50.0 < \nu dN4 \leq 70.2,$ where, when a refractive index of the material at a wavelength of 486 nm is NF, a refractive index of the material at a wavelength of 587.6 nm is Nd, a refractive index of the material at a wavelength of 656 nm is Nc, and an Abbe number vd of the material is vd=(Nd−1)/(NF−Nc), vdP4 represents an Abbe number vd of the first material, and vdN4 represents an Abbe number vd of the second material.

6. The zoom lens according to claim 1, wherein the following conditional expression is satisfied:

$$0.5 < F1M/FTM < 1.0,$$

where F1M represents a focal length of the first lens unit at a wavelength of 1,050 nm, and FTM represents a focal length of the zoom lens at a wavelength of 1,050 nm at the telephoto end.

7. The zoom lens according to claim 1, wherein:
the zoom lens consists of the first lens unit, the second lens unit, and the third lens unit, and
the third lens unit is configured to move toward the object side during zooming from the wide angle end to the telephoto end.

8. The zoom lens according to claim 1, wherein:
the zoom lens consists of, in order from an object side to an image side, the first lens unit, the second lens unit, the third lens unit, and a fourth lens unit having a positive refractive power, and
the fourth lens unit is configured to move toward the object side during zooming from the wide angle end to the telephoto end.

9. The zoom lens according to claim 1, wherein:
the zoom lens consists of, in order from an object side to an image side, the first lens unit, the second lens unit, the third lens unit, a fourth lens unit having a positive refractive power, and a fifth lens unit having a positive refractive power, and
the fourth lens unit is configured to move toward the object side during zooming from the wide angle end to the telephoto end.

10. An image pickup apparatus comprising:
a zoom lens comprising, in order from an object side to an image side:
  a first lens unit having a positive refractive power;
  a second lens unit having a negative refractive power; and
  a third lens unit having a positive refractive power,
  wherein the second lens unit is configured to move toward the image side during zooming from a wide angle end to a telephoto end, with an interval between adjacent lens units being changed during zooming,
  wherein the first lens unit comprises a lens pair (LB1) of a positive lens (LP1) and a negative lens (LN1) that are arranged adjacent to each other, and a lens pair (LB2) of a positive lens (LP2) and a negative lens (LN2) that are arranged adjacent to each other,
  wherein the second lens unit comprises a lens pair (LB3) of a positive lens (LP3) and a negative lens (LN3) that are arranged adjacent to each other, and
  wherein the following conditional expression is satisfied:

$$0.000 < (\theta IRP1 - \theta IRN1)/(\nu IRP1 - \nu IRN1) < 0.015;$$

$$-0.015 < (\theta IRP2 - \theta IRN2)/(\nu IRP2 - \nu IRN2) < 0.000;\text{ and}$$

$$-0.005 < (\theta IRP3 - \theta IRN3)/(\nu IRP3 - \nu IRN3) < 0.015,$$

where, when a refractive index of a material at a wavelength of 400 nm is N400, a refractive index of the material at a wavelength of 1,050 nm is N1050, a refractive index of the material at a wavelength of 1,700 nm is N1700, an Abbe number vIR of the material and a partial dispersion ratio θIR of the material are vIR=(N1050−1)/(N400−N1700) and θIR=(N400−N1050)/(N400−N1700), respectively, vIRP1 and θIRP1 represent an Abbe number vIR and a partial dispersion ratio θIR of a first material for the positive lens (LP1), respectively, vIRN1 and θIRN1 represent an Abbe number vIR and a partial dispersion ratio θIR of a second material for the negative lens (LN1), respectively, vIRP2 and θIRP2 represent an Abbe number vIR and a partial dispersion ratio θIR of a third material for the positive lens (LP2), respectively, vIRN2 and θIRN2 represent an Abbe number vIR and a partial dispersion ratio θIR of a fourth material for the negative lens (LN2), respectively, vIRP3 and θIRP3 represent an Abbe number vIR and a partial dispersion ratio θIR of a fifth material for the positive lens (LP3), respectively, and vIRN3 and θIRN3 represent an Abbe number vIR and a partial dispersion ratio θIR of a sixth material for the negative lens (LN3), respectively; and
a solid-state image pickup element configured to receive light of an image formed by the zoom lens.

* * * * *